United States Patent [19]

Rhode

[11] Patent Number: 5,054,232
[45] Date of Patent: Oct. 8, 1991

[54] ROW CROP BLOCKING METHOD AND APPARATUS

[76] Inventor: Betty J. Rhode, 3255 E. Burnside, Portland, Oreg. 97214

[21] Appl. No.: 488,233

[22] Filed: Mar. 5, 1990

[51] Int. Cl.⁵ .............................................. A01G 1/00
[52] U.S. Cl. ...................................... 47/1.43; 47/1.7; 172/6
[58] Field of Search ................... 47/1.7, 1.43

[56] References Cited

U.S. PATENT DOCUMENTS

| | | | |
|---|---|---|---|
| 3,308,890 | 3/1967 | Rhode | 172/6 |
| 3,402,507 | 9/1968 | Tschudy, Jr. | 47/1.7 |
| 3,701,218 | 10/1972 | Priest | 47/1.43 |
| 3,823,509 | 7/1974 | Arve | 47/1.43 |

FOREIGN PATENT DOCUMENTS 1557724  4/1970  Fed. Rep. of Germany ....... 47/1.43

Primary Examiner—Richard E. Chilcot, Jr.
Assistant Examiner—Joanne C. Downs
Attorney, Agent, or Firm—Kolisch, Hartwell & Dickinson

[57] ABSTRACT

The invention comprises a method and apparatus in which a depending vacuum housing (10) is attached to as vacuum header (12) and includes a lower open end (16) spaced above the ground line. A sensing means (32) is located at the bottom of the housing to locate a plant to be saved raised off the ground by the vacuum. A pair of vacuum air control flaps (44) close off a pair of air slots (34) or coact with each other to close off the housing to the vacuum. When a plant is identified and located the vacuum is shut off by the flaps (44) and a cutter device (60) with blades (63) cuts across the row ahead of the saved plant to create a clear area. After the cutter has created the clear area the cutter halts and within a predetermined time the vacuum is turned on again by opening the flaps to raise the next incoming plant to be saved.

9 Claims, 2 Drawing Sheets

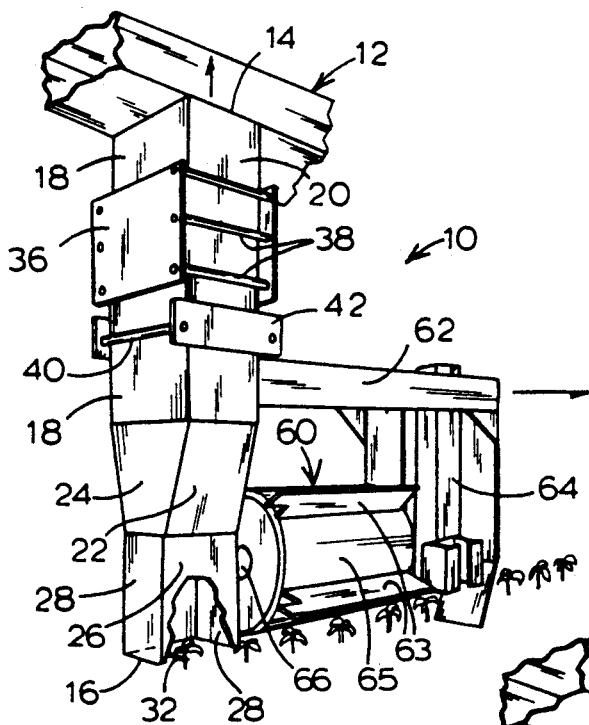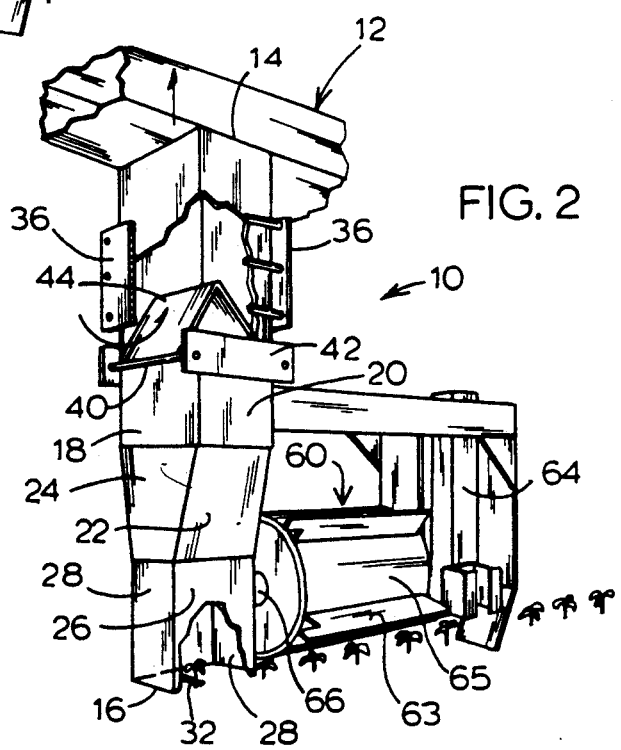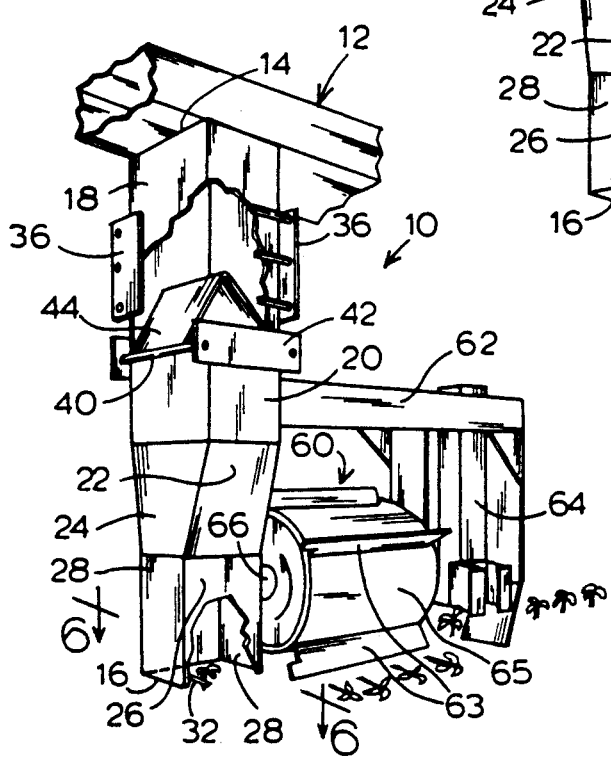

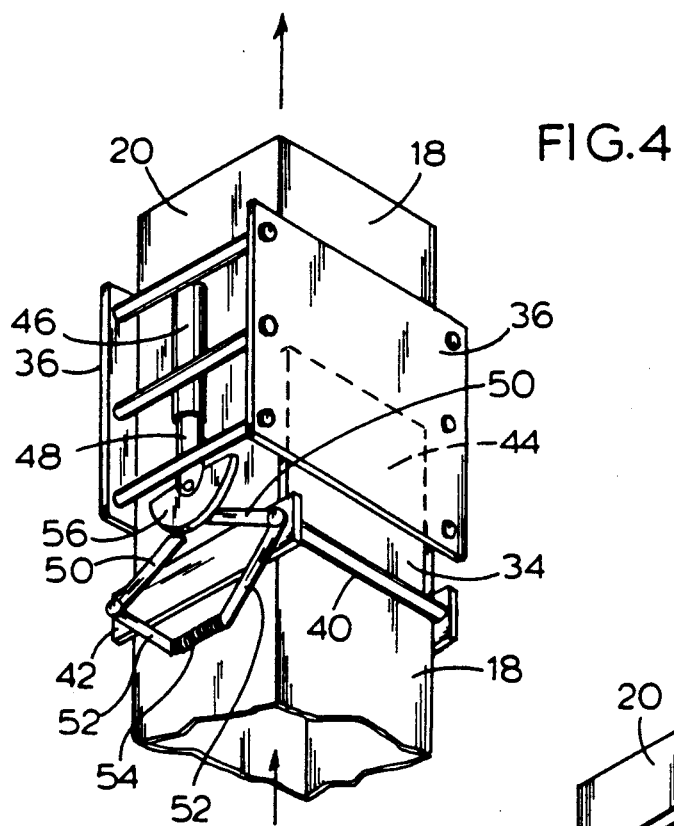
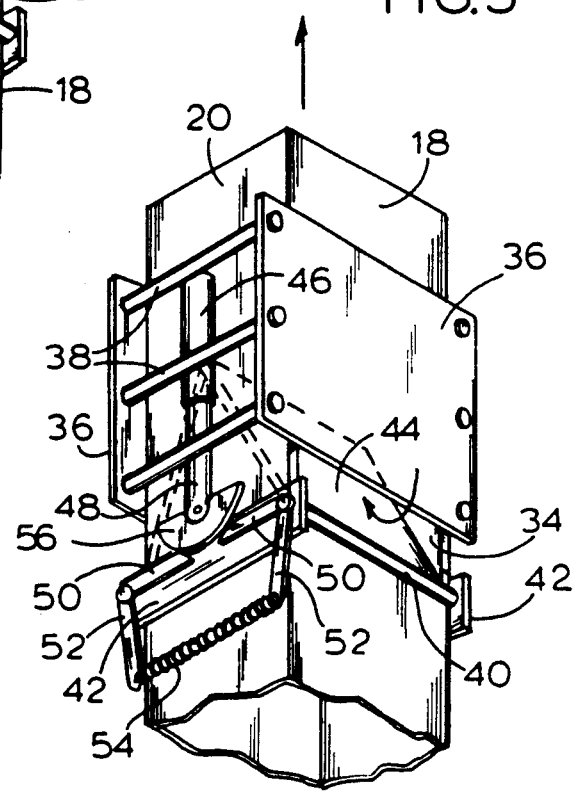
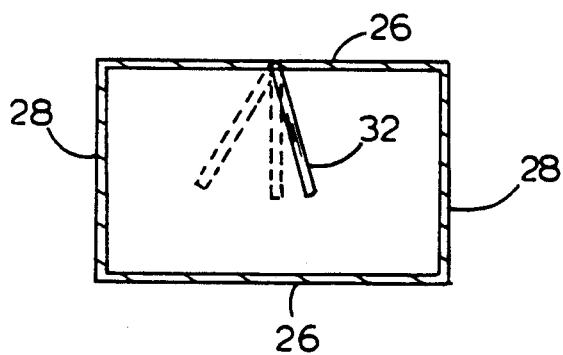

ROW CROP BLOCKING METHOD AND APPARATUS

TECHNICAL FIELD

The invention relates to agricultural machines to thin row crops and plants and more particularly does it relate to an improved method apparatus for identifying a plant to be saved and for accurately spacing saved plants while thinning or blocking sugar beets, lettuce and the like.

BACKGROUND ART

Heretofore known attempts to provide a practical mechanized thinning or blocking method and device for sugar beets or other row crops have been unsuccessful for a number of reasons. The primary disadvantage or defect of prior art devices has been their inability to block on both sides of a single plant with any degree of accuracy. In effect, the devices have not been dependable in locating or isolating a plant and hence a grower could not be certain of obtaining a row with plants spaced uniformly from each other at a prescribed distance. The prior art machines left large gaps in a row and also left plants within an area that should have been a space. The unreliability and inconsistency of the machines has militated against their adoption and usage by row crop farmers. Another disadvantage arises in respect of machines that utilize a vacuum as part of a system for locating individual plants. That disadvantage is the picking up or suctioning of debris into the vacuum housing, including dirt, weeds, rocks and plants. Unless the vacuum system is precisely controlled and utilized the vacuum system rapidly becomes clogged or the fan or blower creating the vacuum becomes damaged because of the debris picked up by the vacuum.

In order to appreciate the significance of the desirability and need for accurate spacing of row crops, it is helpful to understand the problems of the grower. The inability of farmers to achieve equal spacing between plants has a direct effect on crop yield per acre. While adverse weather and plant disease are large problems for a grower, so too is the matter of prescribed spacing between plants. Agricultural authorities have established that for sugar beets, for instance, a plant spacing of 10 inches is best for maximum production. A field with erratic spacing, ranging from 4 to 20 inches, has the adverse result of reducing production by as much as 5 tons per acre. Using hand crews to thin row crops is almost prohibitively expensive, particularly where seeding is heavy which is more desirable from the grower's standpoint than light or thin seeding. Thus the grower is forced into the dilemma of resorting to expensive hand labor or to machines which have not been perfected and which lack precision in establishing accurate spacing as they thin out the excess plants.

Realistically, a farmer should plant seeds thickly or densely enough to assure a well populated row of plants and then thin and leave the desired 10 inches between each plant. It has been demonstrated that a vacuum style machine can be very accurate in thinning plants where populations of twenty plants per foot have germinated and grown to thinning size. This enables the machine to isolate and save a single plant and there is sufficient plant population in the row to assure that another one can be saved at the desired distance forward. Thus, it can be appreciated that the matter of thinning crops is profoundly important to the grower.

The only known prior art row crop thinning machine which is pertinent to the invention disclosed and claimed herein is U.S. Pat. No. 3,308,890 which issued Mar. 14, 1967. That patent shows a system in which the vacuum is applied constantly to the housing 16 by way of header 12 leading to the suction fan or blower. As noted above, the difficulty with the patented device is that it draws a large amount of debris into the vacuum system since there is no controlled utilization of the vacuum air. Other patents which are not pertinent to the invention but which are of interest are U.S. Pat. Nos. 4,117,888; 3,590,925; 3,533,474; 2,433,856; and 3,227,276.

DISCLOSURE OF THE INVENTION

The invention comprises a vacuum housing which is generally vertically disclosed so that the opening into the housing is spaced just above the surface of the ground and so that the housing clears the plants in the row. A sensing wire or trigger is located at the bottom of the housing to engage a plant drawn up off the ground by the vacuum. The housing is attached to a header or conduit leading to the fan or blower inducing the vacuum. At the top or upper part of the housing are a pair of flaps which are designed to close off the housing so that air then enters above the flaps. When it is desirable in the sequence of operations to actuate the vacuum, the flaps open into the housing and close off the entry of air from above the flaps. The purpose of the vacuum is to stand a plant erect long enough for the sensor to engage the plant and initiate a thinning cycle. The vacuum is actuated for a predetermined number of milli-seconds and then the flaps close the housing. Once the trip wire or sensor has been engaged by a plant there is no need to hold the plant up any longer and the housing can be closed off to the vacuum and the air intake is shifted to the openings above the flaps. A rotary type paddle blade forward of the trip wire is actuated to wipe out a given distance of row plants when the cycle is initiated.

Accordingly, it is among the features and advantages of the invention to provide a row crop thinning method and device which controls application of a vacuum in conjunction with a plant sensing means to accurately and reliably isolate and identify a plant which is to be saved. The system cuts or wipes out a predetermined distance of row plants to establish accurate spacing of saved plants. The device is uniquely simple in design, rugged in construction, reliable and economical to produce. The device eliminates the substantial expense of hand blocking by manual labor. Dust and moisture do not affect or impair the operation of the machine. The device allows seeds to be planted very close together thus reducing the chances that mature plants will be too far apart. The thinning achieved by the invention produces precise spacing of saved plants so that maximum production from a given field is realized. Because of the controlled vacuum operation the drawing or lifting of dirt, pebbles and other debris into the vacuum system is minimized to the point where no separator equipment is needed to dispose of debris. Tractor power required when towing the device is greatly reduced and the machine is lighter than its predecessor and much less complicated and much less expensive.

BRIEF DESCRIPTION OF THE DRAWINGS

FIGS. 1 through 3 are views of the device in perspective showing the environment in which it is used and illustrating details of construction of the apparatus and the sequence of operations in a thinning operation using the method device of this invention, FIG. 4 is a view in perspective showing additional details of construction and the means for actuating the flaps and with the flaps open to apply vacuum to the lower open end of the housing.

FIG. 5 is a partial view in perspective showing the structure of FIG. 4 with the flaps closing off the vacuum, and FIG. 6 is a plan view showing the use of a trip wire for sensing plant location.

BEST MODE FOR CARRYING OUT THE INVENTION

Referring now to the drawings it will be seen that an air control or vacuum housing generally designated by the number 10 is attached to a vacuum manifold or header 12 through which reduced air pressure is generated by a blower or fan creating a vacuum. The entire assembly may be supported to the rear by wheels (not shown) while the front will be attached to the towing vehicle or tractor. It will be understood that the upper end of housing 10 opens into the header 12 for application of the vacuum by the structure and in the manner now to be described.

Header or manifold 12 may be a cylindrical or rectangular duct or conduit means of sufficient cross section to allow an air tight joining of housing 10 to header 12. It is contemplated that a single housing and header or multiple combinations at desired row spacings from each other may be employed operating behind a towing tractor or vehicle. The vacuum blower or fan will be driven by a power take off from the tractor and thus in the case of multiple units there will be simultaneous multiple row blocking and thinning of the plants. It is felt that the precise manner of supporting the header and vacuum housing with respect to the tractor is not essential to an understanding of the invention. It is also felt that the precise location of the vacuum generating means need not be shown in detail for an understanding of the invention.

Housing 10 extends generally vertically downward from an upper end 14 to a lower end 16 spaced approximately 1 inch or other predetermined distance above the ground. Overall housing length from top to bottom is approximately 10 inches. The horizontal cross section of the housing is generally rectangular and approximately 6 inches across the wider dimension 18 and about 3 inches across the narrower side 20. For purposes of illustration it will be seen that the vertically extending housing shows the wider side 18 as being transverse to the direction of travel of the device. Offset transition areas 22 and 24 reshape the lower end of the housing so that the lower narrower dimension 28 is transverse or at right angles to the direction of travel while the longer lower side dimension 26 is parallel to the direction of travel.

Extending inwardly below the lower open end 16 of the housing and toward the front is a sensor or plant contact wire 32. It will be understood that means other than a trip wire may be used to initiate a cycle but it is preferred that a sensitive mechanical plant engaging member be used.

FIGS. 4 and 5 show details of a very important part of the invention, namely air flaps which control the location of the air intake to the housing. It is this control which virtually eliminates the problem of vacuuming up dirt, rocks and other debris. Opposed walls 18 of the vacuum housing 10 are provided with openings 34 on each side. Removable reinforcement plates 36 are secured over the openings 34 to provide an air slot of desired size. The plates 36 are interconnected and secured to the vacuum housing by bolts 38. On the lower edge of each air slot 34 is a pivot member or hinge member 40 supported by straps 42. Air flaps 44 are generally rectangular, planar metal sheets which may have a protective rubber or plastic coating or sheeting on either or both sides. One edge of each air flap plate 44 is secured to a hinge member 40. The outside surface of each flap 44 engages plate 36 to completely close off the opening 34 below the plate. The flaps pivoting on hinge members 40 also swing inwardly to the position shown in FIGS. 22, 3 and 5 to close off the vacuum to the lower end of the housing. In this way air is selectively admitted through openings 34 until such instant as the vacuum must again be applied to the lower end of the housing.

The flaps are actuated by a small air cylinder 46 and piston 48 seen in FIGS. 4 and 5. Rigidly attached to one end of each pivot or hinge member 40 is an actuator arm 50 and spring arm 52 which are disposed from each other at a predetermined angle. The tension spring 54 is attached to the free end of each spring arm 52 which biases the flaps to a normal position against the plates 36 to close off the openings 34. Piston 48 has a semicircular nose 56 attached thereto which engages actuating arms 50 to push them down against the pressure of tension spring 54 to force the inner ends of the flaps together to close the throat of the housing and open the gill openings 34 below plates 36.

FIGS. 1 to 3 show a rotary, paddle type cutting blade assembly generally designated by the number 60. A forward extending horizontal frame member 62 is secured to the forward side of housing 10 and at the outer end thereof supports a vertical frame member 64. A support shaft 66 for the paddle blades extends between and is supported by housing 10 and the vertical frame member 64. Also the vertical frame member will support a drive motor for controlled incremental turning of the paddle type cutting blade device. The blades 63 of the paddle wheel device 60 are designed to cut approximately ½ inch below the soil surface. The number of blades 63 on the paddle wheel cylinder 65 may be four or six or more but will depend to some extent on the timing sequence for the device. It is the purpose of the invention to cut off the vacuum while the transverse cutter blades of the paddle wheel are working and disturbing the soil. The blades 63 are shown to be notched at the housing end so that the lower rearmost portion of each extends under the lower end 16 of the housing. The front end of the blades are cut straight as shown. Blades 63 are dimensioned to provide the 6, 8 or 10 inch spacing desired between saved plants.

The operating principles of the invention are that vacuum air is sufficiently fast in comparison to ground speed at which the device is being towed that the plants are lifted or raised into vertical columns as they come under the lower edge or lip 16 of the housing. The plants are erect before encountering the trip wire 32 and are resistant enough to side pressure so that they remain vertical as they engage the trip wire and swing it towards the rear. Time usage of vacuum power is limited to a brief critical period to lift the plant to a rigid posture only long enough to engage the trip wire or sensor. Suction is then suspended until the machine travels a distance to bring the housing near the next group of plants to be engaged.

It will be noted in FIG. 6 that the trip wire 32 is angled slightly forwardly as is shown by the solid lines. The trip wire or sensor such as a photo-electric light beam produces a signal when the trip wire is at a right angle to the row. In this way the location of the plant to be saved is always at the same precise location in relation to the knife or cutter blades 63. As soon as the signal identifying the plant is generated, the flaps are closed, the vacuum shut off and the cutter blades are actuated to clear out the unwanted plants. The saved plant falls and the trip wire returns to its position angling forward of the right angle position. A fraction of a second elapses between the shutting off of the vacuum and the actuation of the cutter blades to allow the rear portions of the blades which move under the housing to clear the saved plant. The cutter blades are then actuated to thin or block out the surplus plants. Since the vacuum is off when a paddle wheels blade engages the row there is no debris being sucked up into the housing and vacuum header. As soon as the blade has completed its cut the vacuum continues to remain off for a set period of time so that the saved plant is considerably behind the housing. The vacuum is then applied as the machine is moved and is ready to engage the next plant to be saved. During the period that it has been off and moving forward the housing has moved partially across the scraped or thinned area. When the vacuum comes back on it is over a blocked or scraped section of the row and is ready to pick up the first incoming plant to begin the cycle or sequence of operations anew. It is to be appreciated that the time intervals while not identified with precision are defined in milli-seconds. A typical cycle or sequence, for instance, begins with the device approaching plants in a row. Vacuum is applied by opening the flaps and closing off the gills or slots 34. An incoming plant is lifted by the vacuum into its interference or upright posture. The forwardly angled trip wire engages the plant at time 0.000 seconds. At an angle perpendicular to the row and the direction of travel of the device a signal is generated closing the air flaps and stopping the vacuum. Approximately 0.030 seconds elapse between the trip wire contact with the incoming plant and the signal turning off the vacuum. With the vacuum off and at time 0.035 the drive means for the paddle wheel cutter blades is ratcheted or incrementally rotated to move one blade 63 transversely through the row to thin or block out the surplus plants at the desired interval or spacing. The vacuum remains off for a period of 0.250 seconds after the cut as the device moves forwardly so that the saved plant is safely outside and behind the vacuum housing. The vacuum then comes on again and the cycle repeats.

We claim:

1. A row crop thinning device adapted to be moved over and along a crop row by a towing vehicle, comprising:
   (a) A tubular header member connected to a means for creating a vacuum therein,
   (b) a depending, generally vertically disposed tubular vacuum housing attached to and opening into said header, said vacuum housing being open at its lower end and said lower end being adapted to be spaced a predetermined distance above the ground line of said crop row,
   (c) a plant sensing means located at the lower open end of said housing for identifying and isolating a plant to be saved which has been drawn upwardly into said housing by said vacuum, said sensing means being adapted to generate a control signal within a predetermined time from the moment of sensing of said plant to be saved,
   (d) cutter blade means mounted forwardly of said housing in the direction of movement of said device, said cutter blade means being of predetermined length to establish spacing between plants to be saved and also being movable generally transversely to and below the ground line of said crop row to cut away surplus plants from said row,
   (e) vacuum control means located in said housing above said open lower end thereof including air inlet opening means above said open lower end and further including vacuum air control flap means mounted so as to have a first operable position closing said air inlet opening means and opening said housing to vacuum in said header such that vacuum is created at the lower open end of said housing and having a second operable position in which said housing is closed to shut off vacuum to said lower open end thereof and open said air inlet opening means, whereby application of vacuum to said housing is controlled selectively to sense a plant and then shut off so that said cutter blade means may be actuated to cut away surplus plants and establish spacing between saved plants.

2. The row crop thinning device according to claim 1 wherein said vacuum housing is generally rectangular and connection thereof to said header is substantially air tight.

3. The row crop thinning device according to claim 2 wherein said sensing means comprises a trip wire extending generally horizontally across the open lower end of said housing to engage a plant to be saved whereby a predetermined movement of said trip wire caused by being engaged by a plant will generate a control signal to shut off said vacuum and to cause a timed actuation of said cutter blade means.

4. The row crop thinning device according to claim 3 wherein said cutter blade means comprises an incrementally rotary mounting cylinder means having a plurality of radially extending blades thereon generally equispaced from each other, the rotary axis of said mounting cylinder means being supported above and generally parallel to said crop row by frame means forming a part of said thinning device.

5. The row crop thinning device according to claim 4 wherein said vacuum housing is generally rectangular in cross section and said vacuum control means is located between said open lower end and said vacuum header and wherein said air inlet opening means comprises a pair of opposed pivotal flaps, each of which has said first and second operable positions selectively to close off said air slot means and said open lower end of said housing to said vacuum.

6. The row crop thinning device according to claim 1 wherein said sensing means comprises a trip wire extending generally horizontally across the open lower end of said housing to engage a plant to be saved whereby a predetermined movement of said trip wire caused by being engaged by a plant will generate a control signal to shut off said vacuum and to cause a timed actuation of said cutter blade means.

7. The row crop thinning device according to claim 1 wherein said cutter blade means comprises an incrementally rotary mounting cylinder means having a plurality of blades thereon generally equispaced from each other, the rotary axis of said mounting cylinder means being supported above and generally parallel to said crop row by frame means forming a part of said thinning device.

8. The row crop thinning device according to claim 1 wherein said vacuum housing is generally rectangular in cross section and said vacuum control means is located between said open lower end and said vacuum header and wherein said air inlet opening means comprises opposed air slot means, said vacuum air control flap means comprises a pair of opposed pivotal flaps, each of which has said first and second operable positions to close off its respective said air slot means and to coact with each other in said second position to close off said open lower end of said housing to said vacuum.

9. A method for thinning row crops, comprising:
(a) initiating a vacuum over a plant to be saved to lift said plant off the ground and into an upstanding column,
(b) sensing the location of said plant as it is upstanding in said vacuum by sensing means adapted to generate a control signal,
(c) providing a control signal from said sensing means to shut off said vacuum,
(d) within a predetermined period of time of shutting off said vacuum, applying cutting means to remove surplus plants and create a clean area for a selected distance from said plant to be saved,
(e) reinitiating said vacuum after said cutting step to prepare to raise the next plant in said row after said clean area, and
(f) repeating said series of row crop thinning steps.

* * * * *